Nov. 14, 1939.   I. A. STEPHENS   2,179,647
TRAPPER'S SPRING GUN
Filed March 3, 1937
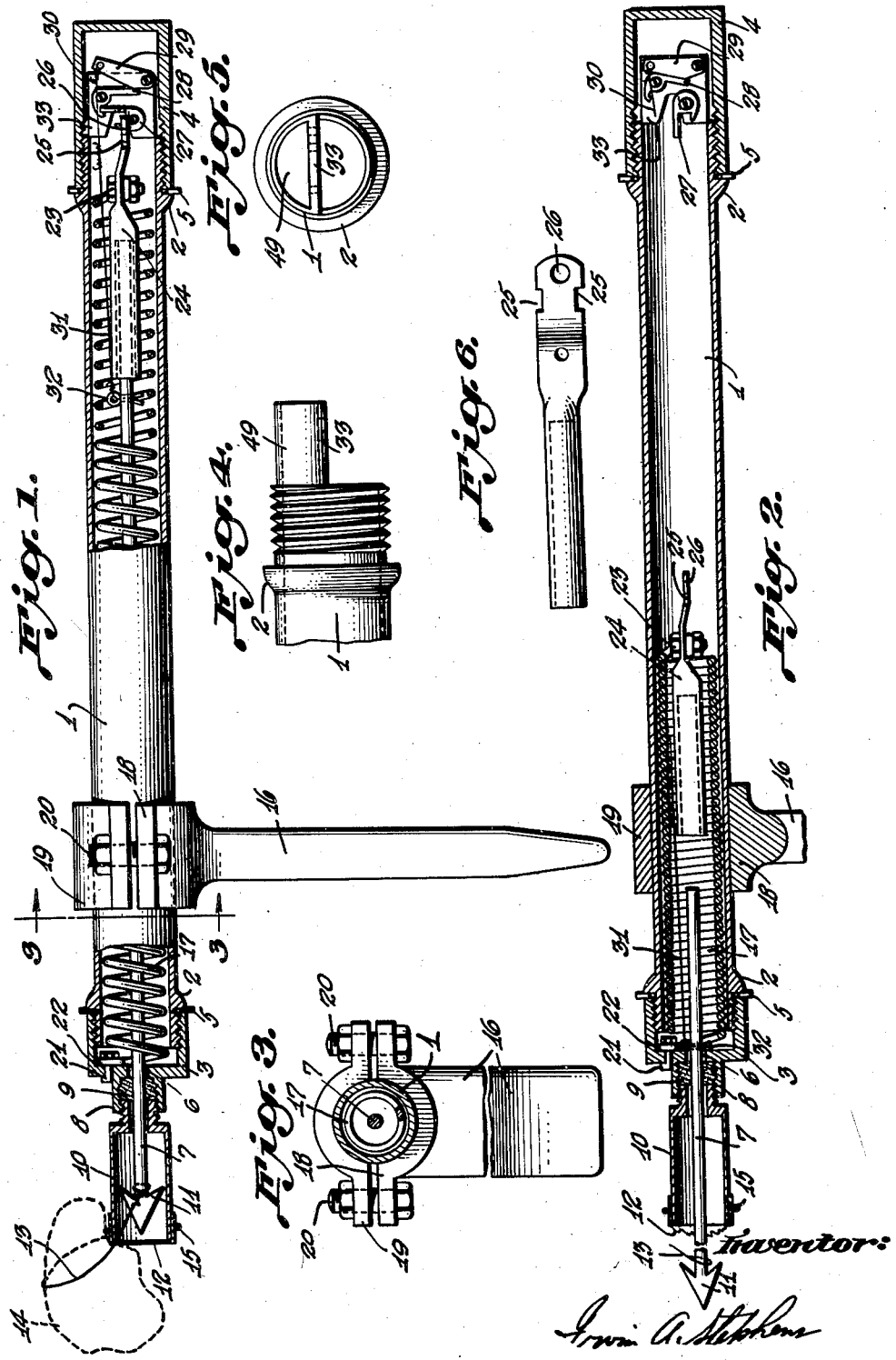

Patented Nov. 14, 1939

2,179,647

UNITED STATES PATENT OFFICE 2,179,647

TRAPPER'S SPRING GUN

Irvin A. Stephens, Las Vegas, Nev.

Application March 3, 1937, Serial No. 128,718

1 Claim. (Cl. 43—79)

The invention relates to improvements in trappers' spring operated guns designed for the purpose of effectively and humanely killing animals, particularly of the more cunning fur-bearing variety; and the objects of the improvements are, first, to provide a spring gun in which the working mechanics or moving parts are completely protected from the elements of nature (dirt, mud water, ice and so forth), second, to effect an almost certainty of striking an animal tripping the spring gun and, third, to eliminate to a minimum, damage being done by the spring gun to the pelt of the animal.

One form of the invention is illustrated in the accompanying drawing, in which Figure 1 is a vertical sectional view of the entire spring gun with the parts being shown in the retracted position; Figure 2, a similar view of the same but with the parts being shown in an extended or forward position; Figure 3, a cross-sectional view of a part of the spring gun on the line 3—3, Figure 1; Figure 4 and Figure 5, a top view and a rear view respectively of a rear portion of the casing 1 only, hereinafter referred to, and Figure 6, a top view of the socket 24 only, also hereinafter referred to, further illustrating the construction features of this part.

The cylindrical casing 1, previously mentioned, constitutes the main body of the spring gun. Both ends of the said casing 1 are shaped to form two circular shoulders 2, 2 and threaded outwardly from the said shoulders 2, 2 to receive the front casing cap 3 and the rear casing cap 4, these joints being sealed with the two gaskets 5, 5. (See Figures 1, 2, 4 and 5.)

The front casing cap 3, referred to above, is provided with a central hole 6, which allows the free passage of and guides the round straight spear rod 7; and also is provided with an external cylindrical receptacle 8, located around said central hole 6, large enough internally to contain suitable spear rod packing 9 and long enough to be threaded internally for the reception of the rear end, which end is formed and threaded to serve as an adjustable packing nut of the packing nut and spear head protector 10, the latter being constructed in one unit. The forward end of the said packing nut and spear head protector 10 is cylindrically shaped and properly sized to admit retracting within itself of the entire spead head 11, which is formed on or attached to the forward end of the said spear rod 7; and is covered with a protecting cap 12, which is, first, made of cloth or paper or other suitable material that is easily penetrable by the said spear head 11 when the spring gun is tripped, second, coated or saturated with oil or grease or other similar substance to prevent the adhering thereto of ice or snow, third, pierced by a bait wire 13 connecting the bait 14 (outside) to the forward end of the said spear rod 7 (inside) and, fourth, held in place by a clip 15 or by other satisfactory known means. (See Figures 1 and 2.)

The support peg 16 serves the purpose of arresting the recoil action on the spring gun caused by the sudden thrust of the spring 17, hereinafter referred to, when the spring gun is tripped; is shaped in the form of a plane running transversely to that of the casing and has sufficient length and width to best serve its purpose; and is connected to and held at a right angle to the previously referred to casing 1 by some good known type of clamp formed on or attached to one of its ends. In the accompanying drawing, I have illustrated the split type of clamp shown in Figures 1 and 3, consisting of the half clamp 18 connected to the clamp 19 cap by the two bolts 20 20. An anchoring chain (not shown) may also be clamped on.

The above mentioned and described parts, excepting the spring 17, form the outer appearance of the spring gun and show its special features for resisting the elements of nature accomplished by the inclosed construction, thereby rendering the use of the spring gun valuable in all kinds of weather and under almost all kinds of circumstances and giving the exceptional advantage of being able to hide or bury the spring gun in dirt, snow, mud, brush or other useful cover when trapping for the more cunning animals.

The spring 17, previously referred to, is a spiral tension type of spring, slightly smaller in outside diameter than the inside diameter of the casing 1, described above; is attached to the previously described front casing cap 3 by the bolt 21, on which a gasket 22 is used to seal the necessary hole in the said front casing cap 3; and the rear end is connected by means of a bolt 23 to the central part of the socket 24, which serves the double purpose of spring retainer and spear rod receiver and is suspended centrally and longitudinally in relation to the said spring 17 and in such a manner that its hollow or cylindrical front end extends forward to receive loosely and freely the rear end of the spear rod 7, previously described, while the flattened rear end extends backwards and is provided with the two setting slots 25 25, hereinafter referred to, and the trigger hole 26. (See Figures 1, 2 and 6.) The said hole 26 receives the forward lug of the J-shaped trigger lever 27, which has its fulcrum at the bottom and the top end of its rear and long arm retained from a forward movement by a lug on the front end of the horizontal short arm of the inverted L-shaped trigger lever 28, which has its fulcrum at the point of angle and its vertical long arm extending downward to contact a lug on and located below the center of a straight trigger lever 29, which has its fulcrum at its lower end and at its top end a lug, which is connected by a small breakable trigger wire 30 to a large permanent trigger wire 31, which latter unit is secured to the said spear rod 7 at a point in front of the said socket 24 by a pin 32, which serves the further duty of preventing the said spear rod 7 from being thrown clear out of the spring gun. (See Figures 1 and 2.)

The above described set of three trigger levers 27, 28 and 29 is held in a vertical plane and in a centralized position in relation to the previously described casing 1 by a trigger plate 33, which is welded, clamped or otherwise securely fastened to an extended section of the rear end of the said casing 1. Figure 4 and Figure 5 illustrate one manner in which this may be accomplished.

Four more features or advantages can now be seen in the spring gun in that, first, the multiple trigger levers afford means of keeping the trigger unit within the casing and still allow easy tripping of the spring gun, second, the special socket construction that allows the reception of the rear end of the spear rod in a free and frictionless manner, thereby giving the advantage of eliminating an external trigger-to-bait rod by using the spear rod instead, third, these two features combined offer the further advantage of permitting the attachment of the bait directly to the spear, which brings the animal in almost certain line with the spear when it attempts to take the bait, and, fourth, with the bait so located, the spear will most likely strike the animal in or close to the mouth, eliminating damage being done to the more valuable parts of the pelt.

The forms herein described I consider convenient embodiments of my invention; but it will be readily understood that minor changes in the size, form and construction of the various parts of my improved trapper's spring gun can be made and substituted for those therein shown without departing from the proper scope of my invention.

The following description is the method in which my trapper's spring gun is operated:

The "setting" or retracting of the spring gun is accomplished by removing the rear casing cap 4, inserting a setting tool into the casing 1 from the rear end, hooking two properly provided lugs of the setting tool into the two slots 25 25 on the socket 24 and pulling backwards on the setting tool, thereby retracting the spring 17, until the socket 24 can be secured to the set of trigger levers 27, 28 and 29. Then hook the bait wire 13 around the spear rod 7 just behind the spear head 11, place the rear end of the spear rod 7 in the front end of the socket 24, adjust the packing nut and spear head protector 10 to the desired tension (that is, just tight enough to keep out water, dirt and so forth) on the spear rod packing 9, pierce the protecting cap 12 with the free end of the bait wire 13, secure the protecting cap 12 in its place over the front end of the packing nut and spear head protector 10 and attach the bait 14 on the free end of the bait wire 13. Now connect the permanent trigger wire 31 to the lug on the straight trigger lever 29 by means of the breakable trigger wire 30, replacing the latter if necessary, and replace the rear casing cap 4. The spring gun is now in a "set" or retracted position.

The "tripping" or releasing of the spring gun is now easily accomplished when an animal pulls on the bait 14, which transmits the pull, in respective order, to the bait wire 13, the spear rod 7, the pin 32, the permanent trigger wire 31, the breakable trigger wire 30 and the set of triggers 27, 28 and 29, thereby releasing the socket 24, which allows the spring 17 to suddenly thrust the spear forward. It will be seen that in this operation of the spring gun, the breakable trigger wire 30 must be either broken or pulled loose from the lug on the trigger lever 29 and that the protecting cap 12 must be penetrated by the spear head 11.

I am aware that prior to my invention, spring operated trappers' guns have been made. I therefore do not claim a basic invention; but

I claim:

A spring gun comprising a hollow casing, a spear having a greater portion of the shank thereof within the casing and the head thereof outside the casing, a trigger mechanism secured to and within the casing, a socket within the casing adapted to surround one end of the shank and adapted to be connected to the trigger mechanism, a coiled spring surrounding the shank and secured at one end to the casing and at the other end to the socket, a bait securing member attached to the spear head, an eye secured to the shank and a frangible member attached to the eye and to the trigger mechanism whereby when a force is applied to draw the bait securing member away from the spear head a force will be transmitted through the spear to the frangible member thereby breaking the frangible member, releasing the socket, and permitting the spring to project the spear in the direction of the bait end of the casing.

IRVIN A. STEPHENS.